United States Patent
Arakawa (10) Patent No.: US 6,596,365 B2
(45) Date of Patent: Jul. 22, 2003

(54) OPTICAL RECORDING MEDIUM AND METHOD FOR PRODUCING THE SAME

(75) Inventor: Nobuyuki Arakawa, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/913,890

(22) PCT Filed: Dec. 25, 2000

(86) PCT No.: PCT/JP00/09205

§ 371 (c)(1),
(2), (4) Date: Aug. 17, 2001

(87) PCT Pub. No.: WO01/48750

PCT Pub. Date: Jul. 5, 2001

(65) Prior Publication Data

US 2003/0021940 A1 Jan. 30, 2003

(30) Foreign Application Priority Data

Dec. 28, 1999 (JP) ............................................ 11-375338

(51) Int. Cl.⁷ ................................................. B32B 3/02
(52) U.S. Cl. ..................... 428/64.1; 428/64.4; 428/363; 428/364
(58) Field of Search ............................... 428/64.1, 64.4, 428/365, 364, 384, 402, 913; 430/270.11, 495.1, 945; 369/275.1

(56) References Cited

U.S. PATENT DOCUMENTS 5,620,765 A * 4/1997 Shaw-Lien ................. 428/64.1
6,162,519 A * 12/2000 Takakuwa ................... 428/64.1
6,329,035 B1 * 12/2002 Iwasaki ...................... 428/64.1

FOREIGN PATENT DOCUMENTS

| JP | 59-203249 | 11/1984 |
| JP | 8-263874 | 10/1996 |
| JP | 11-242829 | 9/1999 |
| JP | 11-345431 | 12/1999 |

* cited by examiner

Primary Examiner—Elizabeth Mulvaney
(74) Attorney, Agent, or Firm—Rader, Fishman & Grauer PLLC; Ronald P. Kananen, Esq.

(57) ABSTRACT

An optical recording medium comprises a substrate having one principal surface on which uneven pattern is formed, and adapted so that light is irradiated onto the uneven pattern and recording/reproduction of recording signals are carried out by the irradiated light. The substrate includes an intermediate layer including rigidity rendering material and a surface layer formed on at least one principal surface of the intermediate layer and adapted so that the uneven pattern is formed. As the rigidity rendering material, there are used granulated filling material, plate-shaped filling material and fiber material. In manufacturing such an optical recording medium, the surface layer is disposed in a manner to oppose stamper where reversed uneven pattern is formed and the intermediate layer including rigidity rendering material is stacked on the surface layer. By heating and pressure-fitting such stamper, surface layer and intermediate layer, the surface layer and the intermediate layer are integrated and the reversed uneven pattern is transferred onto the surface layer.

9 Claims, 8 Drawing Sheets

OPTICAL RECORDING MEDIUM AND METHOD FOR PRODUCING THE SAME

DESCRIPTION

1. Technical Field

This invention relates to an optical recording medium provided with a substrate having an uneven pattern formed on at least one principal surface and a method of manufacturing such an optical recording medium.

2. Background Art

Optical recording media are recording media used with respect to recording/reproducing apparatus and adapted so that recording and/or reproduction (hereinafter referred to as recording/reproduction) of various information, e.g., audio (sound) information, picture information or character information, etc. is carried out by such recording/reproduction apparatus (unit). Optical recording media generally have a disc shape. There are various kinds of optical discs, including, for example, an optical disc in which recording signals are written in advance by physical uneven shapes called pits, a phase change type optical disc in which recording signals are written by making use of the phase change of a signal recording layer, and magneto-optical discs in which recording/reproduction of recording signals is carried out by making use of the magneto- optical effect of a signal recording layer, etc.

At the optical recording medium, there are provided recording portions for recording signals called recording tracks in the circumferential direction on the principal surface thereof. Further, the recording/reproducing unit irradiates light toward these recording tracks to carry out recording/reproduction of recording signals. At the optical recording medium, e.g., land grooves which are physical uneven shapes corresponding to recording tracks and/or fine uneven patterns such as pits, etc. written in advance are formed on the signal recording surface. Such fine uneven patterns are ordinarily formed by transfer by means of a stamper onto the side serving as a signal recording surface of this disc substrate when the disc substrate is injection-molded by resin material. Namely, at the time of forming the substrate having an uneven pattern, the stamper having a reversed uneven pattern in which an uneven pattern is reversed is first formed to carry out injection molding using such a stamper.

Meanwhile, in the above-described injection molding process for the disc substrate, by influences such as pressure change and temperature change at the time of injection-filling molten (fused) resin material and/or friction between resin material and metal mold, etc., there takes place stress such as molecular orientation distortion or thermal distortion, etc. in this resin material. Further, in this injection molding process, in the process until molten resin material is cooled and hardened within the metal mold, stress produced in the resin material is relaxed, but a partial pressure which has remained without being relaxed is left as residual stress within the completed disc substrate. In such optical recording mediums, when internal stress remains within the disc substrate, there may take place deformation such as curvature or undulation, etc. and/or uneven double refraction distribution, etc.

Further, since the disc substrate is formed by resin material, it is difficult to avoid contraction deformation particularly in the cooling process of the injection molding process. In a more practical sense, in the case where contraction at the outer circumferential portion of the disc substrate is greater than that at the inner circumferential portion thereof, the disc substrate is deformed so as to take a propeller shape. In addition, in the case where contraction at the outer circumferential portion is greater than that at the inner circumferential portion, the disc substrate is deformed so as to take a bowl shape.

For this reason, in the conventional injection molding process, in order to suppress, to the utmost, such contraction deformation or deformation of disc substrate by the above-described residual internal stress, complicated labors are required such as weakening the clamping pressure of the metal mold, lowering the injection speed of resin material and/or weakening the injection pressure of resin material. In addition, in the conventional injection molding process, such deformation is produced, whereby concave (hollow) portion or swollen portion takes place at the outer circumferential portion of the disc substrate, or it becomes difficult to transfer, with good accuracy, reversed uneven patterns of stamper.

For this reason, in the conventional injection molding process, resin material having low molecular weight is used to enhance fluidity of resin material or to increase temperature at the time of injection of this resin material and temperature of the metal mold to thereby realize reduction of double refraction of the disc substrate and to ensure transfer characteristic from the stamper. However, in the conventional injection molding process, there is the problem that the molecular weight of resin material is reduced so that mechanical characteristic such as rigidity, etc. of the disc substrate is degraded. In addition, in the conventional injection molding process, there is the problem that metal mold temperature is increased so that thermal deformation takes place at the time of taking out the disc substrate, or the molding cycle is elongated.

Meanwhile, in this optical recording medium, with the increase of the quantity of data to be handled in computer equipment, etc., realization of large capacity is required. In order to realize large capacity, it is necessary to increase information quantity per unit area, i.e., promote realization of high density recording. In the optical recording media, it is possible to carry out, with high density, recording/reproduction of signals by lasers of short wavelength and optical systems using object lens (objective) having a high N.A. (Numerical Aperture) at the time of recording/reproduction.

However, in the case where such an optical disc is used, focal depth of the object lens becomes small, and spot diameter of the laser becomes small. As a result, the position of the object lens used for recording/reproduction is caused to be in the vicinity of the surface from the bottom surface of the optical recording medium. Accordingly, the allowed range of curvature or undulation, etc. of the substrate becomes small. This is apparent from the relational expression between N.A. of the object lens and substrate thickness and the relationship between wave length and N.A.

$$f = D/2NA > WD >$$

f: Focal distance of lens

D: Effective diameter of object lens

N.A.: Numerical Aperture of object lens

WD: Actuation distance of the object lens

Focal depth $\propto \ddot{e}/(NA)^2$

SKEW allowed value $\propto \ddot{e}/(NA)^3$

Thickness unevenness allowed value $\propto \ddot{e}/(NA)^4$

Strength of disc $\propto (\text{thickness})^3$

When the relationship between NA and thickness of optically transparent substrate is determined from the above-mentioned relational expressions, there are provided the following relationships.

In the case where NA=0.5, substrate thickness 1.2 mm.

In the case where NA=0.6, substrate thickness 0.6 mm.

In the case where NA=0.75, substrate thickness 0.3 mm.

In the case where NA=0.85, substrate thickness 0.1 mm.

As stated above, in the optical recording media, it is necessary to thin the substrate for high density recording. However, since strength of the substrate has the relationship proportional to the third power of thickness, when the substrate is caused to be of thin thickness the strength of the substrate is lowered substantially. In addition at the time of manufacturing the thin substrate, the substrate is molded while being solidified resulting from a temperature difference between metal mold and resin. Thus, orientation distortion becomes more conspicuous. For example, in the case where thickness of the substrate is 0.4 mm or less, degradation of transfer characteristic, unevenness of double refraction and occurrence of curvature become conspicuous along with orientation distortion.

For this reason, in the optical recording medium, as material for forming substrate, it is desirable to use material excellent in bending and tensile strength and having high rigidity. As material stated above, there is mentioned compound mold material in which filler or short fiber is mixed into ordinary resin material. However, with such compound mold material, the surface has a pear-skin or rough property by filler or short fiber. For this reason, in the case where the compound mold material is used, there is the problem that it is impossible to precisely transfer fine uneven patterns in order to manufacture substrate suitable for optical recording media which cope with high density recording.

Disclosure of the invention

An object of this invention is to provide an optical recording medium in which there is no deformation such as curvature or concave portion of the disc substrate, having sufficient rotation performance, and which can sufficiently cope with realization of high recording density and a method of manufacturing such an optical recording medium.

The optical recording medium according to this invention is directed to an optical recording medium comprising a substrate having an uneven pattern formed on at least one principal surface and adapted so that light is irradiated onto the uneven pattern and recording and/or reproduction of recording signals are carried out by the light, the substrate including an intermediate layer including a rigidity rendering material and a surface layer formed on at least one principal surface of the intermediate layer and having the uneven pattern formed thereon.

In the optical recording medium according to this invention thus constituted, rigidity of the substrate is enhanced by the intermediate layer including the rigidity rendering material, and the uneven pattern is formed on the surface layer formed on the intermediate layer. For this reason, in the optical recording medium it is not possible for the rigidity rendering material to face the surface where the uneven pattern is formed. Thus, the optical recording medium exhibits excellent signal characteristics and has excellent rigidity.

In addition, the method of manufacturing an optical recording medium according to this invention is directed to a method of manufacturing an optical recording medium comprising a substrate having an uneven pattern formed on at least one principal surface, and adapted so that light is irradiated onto the uneven pattern and recording and/or reproduction of recording signals are carried out by the light, wherein a surface layer is disposed in a manner to oppose one principal surface of a stamper where reversed uneven pattern is formed on the one principal surface and an intermediate layer including an rigidity rendering material is stacked on the surface layer to pressure-fit the stamper, the surface layer and the intermediate layer to thereby integrate the surface layer and the intermediate layer and to transfer the reversed uneven pattern onto the surface layer.

In the method of manufacturing the optical recording medium according to this invention thus featured, there is employed such an approach to transfer a reversed uneven pattern formed on the stamper onto the surface layer to integrate the surface layer and the intermediate layer including the rigidity rendering material to thereby form substrate. For this reason, in accordance with this technique, it is possible to manufacture a substrate having excellent rigidity and to transfer a reversed uneven pattern with high accuracy.

BEST MODE FOR CARRYING OUT THE INVENTION

Preferred embodiments of an optical recording medium and a method of manufacturing the same according to this invention will now be described in detail with reference to the attached drawings. In the following description, as the optical recording medium, there is mentioned as an example a magneto- optical disc comprising a magnetic recording layer capable of recording signals as magnetization direction, wherein light of a predetermined wavelength is irradiated onto this magnetic recording layer to thereby carry out recording/reproduction of recording signals, i.e., to record/reproduce recording signals by the so-called magneto-optical recording system. It is to be noted that this invention can be widely applied to optical discs for carrying out recording/reproduction of recording signals with respect to the optical recording media, and, e.g., there may be employed reproduction only optical disc capable of only recording signals with respect to the optical recording medium, phase change type optical disc comprising recording layer consisting of phase change material, and the like.

Figure 1:
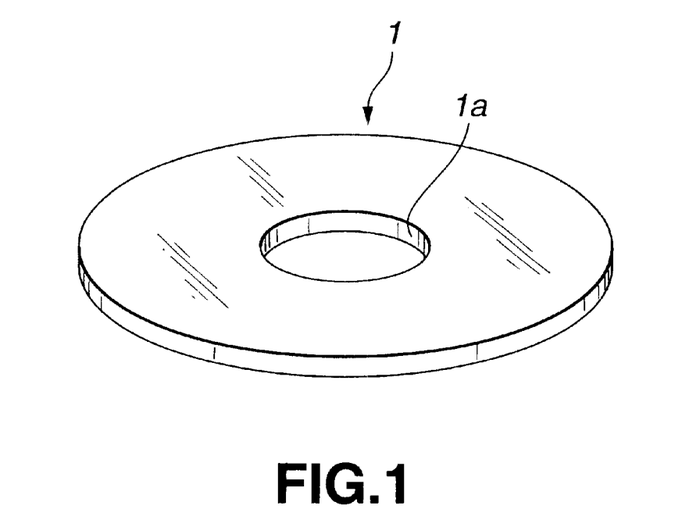
FIG. 1 is a perspective view of an optical disc shown as an example of an optical recording medium according to this invention.
Figure 2:
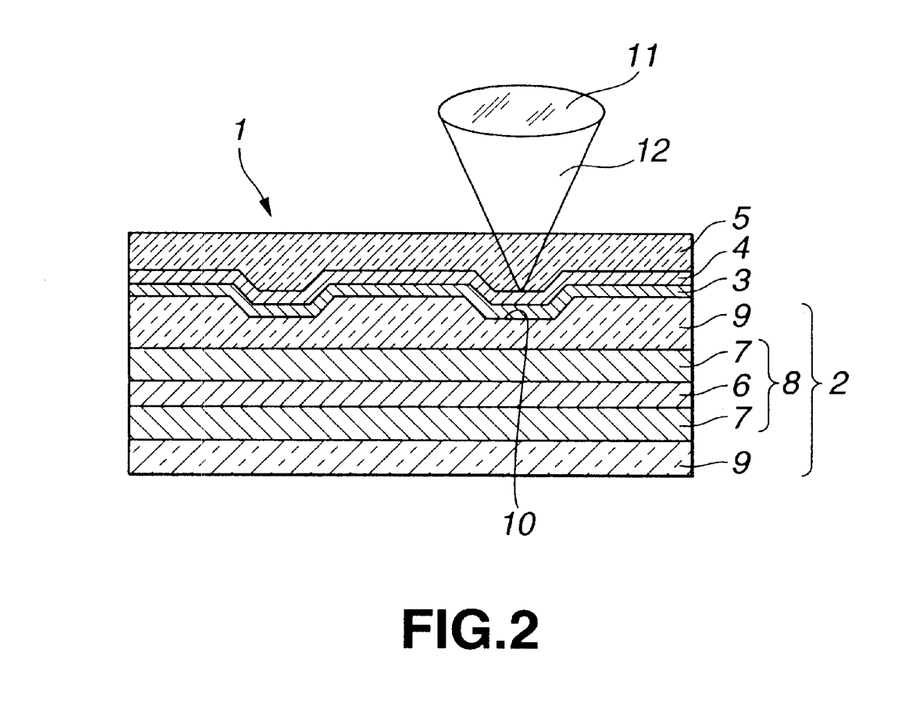
FIG. 2 is an essential part cross sectional view of the optical disc.

In the following description, explanation will be given in connection with an optical disc 1 as shown in FIGS. 1 and 2. As shown in FIG. 1, the optical disc 1 is substantially disc-shaped as a whole wherein a center hole 1a is bored at the central portion thereof.

As shown in FIG. 2, the optical disc 1 is adapted so that a light reflection layer 3, a signal recording layer 4 and a light transmission layer 5 are stacked in order on a substrate 2. In this optical disc 1, the substrate 2 is composed of an intermediate layer 8 including a fiber layer 6 and core layers 7, and surface layers 9 formed so as to cover this intermediate layer 8, and is caused to be of the so-called sandwich structure in which surface layers 9 are respectively adhered (bonded) on both principal surface sides of the intermediate layer 8. Moreover, the substrate 2 is adapted so that a clamping member (not shown) constituting the center hole 1a is attached at the center hole.

Further, at this optical disc 1, an uneven pattern 10 is formed. The uneven pattern 10 is adapted so that fine uneven portions such as pregroove, etc. are formed as changes of physical shape, and serves as a positioning reference when the optical disc apparatus (unit) carries out recording/reproduction with respect to the optical disc 1. It is to be noted that in the case where the optical disc 1 is reproducing only an optical disc, e.g., CD (Compact Disc), etc., the uneven pattern 10 may be pits indicating recording the signal.

The optical disc 1 is detachably used with respect to an optical disc unit (not shown), wherein reproduction of recording signals recorded at the signal recording layer 3 is carried out a by recording/reproducing head (not shown) disposed at this optical disc unit. In this optical disc 1, at the time of reproducing signals, laser beams 12 are converged by an optical lens 11 disposed at the recording/reproducing head and those laser beams 12 are incident from the optical transmission layer 5 side toward the signal recording layer 4. Further, in the optical disc unit, pick-up detects return light obtained as the result of the fact that laser beams 12 are reflected by the signal recording layer 4 and the light reflection layer 3 so that they return to thereby carry out recording/reproduction of recording signals with respect to the optical disc 1.

In the substrate 2, the intermediate layer 8 is composed of fiber layer 6, including fiber material such as carbon fiber material or unwoven cloth, etc. and core layers 7 are formed so as to cover this fiber layer 6. The fiber layer 6 may be layer obtained by processing fiber material such as carbon fiber material or unwoven cloth, etc. so as to take a desired shape, or layer obtained by fixing fiber material such as carbon fiber material or unwoven cloth, etc. by a predetermined resin. Further, in this optical disc 1, since light is irradiated from the light transmission layer 5 side at the time of recording/reproduction, it is unnecessary for the substrate 2 to exhibit light transmission property. For this reason, in the optical disc 1, even if fiber material such as carbon fiber material or unwoven cloth, etc. is included in the fiber layer 6, there is no influence with respect to light irradiated at the time of recording/reproduction. Namely, in this optical disc 1, it is unnecessary to take the optical characteristics into consideration at the time of selecting the material of the substrate 2, and such material can be suitably determined in consideration of the resonance characteristics or mechanical characteristics, etc.

In the substrate 2, uneven pattern 10 as described above is formed on surface layer 9 by transferring a reversed uneven pattern formed on the stamper as described in detail later. For this reason, it is preferable that the surface layer 9 is formed by resin material excellent in the transfer characteristic in order to securely transfer the reversed uneven pattern formed on the stamper. In other words, since rigidity of the substrate 2 is enhanced by the intermediate layer 8, it is sufficient to suitably select material by taking into consideration transfer characteristics rather than the resonance characteristics or the mechanical characteristics as the surface layer 9.

Further, it is preferable that the surface layer 9 of the substrate 2 is formed by resin having a percentage of water absorption of 0.3% or less. Furthermore, it is more preferable to form surface layer 9 by using resin having a percentage of water absorption of 0.1% or less. By forming the surface layer 9 by resin having percentage of water absorption of 0.3% or less, it impossible to prevent the surface layer 9 from absorbing moisture, etc. in air so that the optical disc is deformed. Thus, an optical disc 1 having less quantity of deformation can be formed. For example, even in the case where the curvature deformation angle is less than 0.4 degrees in the predetermined standard, the percentage of water absorption of resin is caused to be 0.3% or less, thereby making it possible to securely satisfy the above-mentioned standard.

Particularly, in the case where resin having percentage of water absorption of 0.1% or less is used, water is hardly absorbed. Accordingly, it is sufficient that water absorption deformation is not taken into consideration even in all the preservation/use environments. For this reason, in the case where a resin having percentage of water absorption of 0.1% or less is used, it is sufficient to suppress deformation at the time of manufacturing of the substrate. Thus, the system margin is increased.

On the other hand, in the optical disc 1, on the surface where the uneven pattern 10 is formed of the substrate 2, a light reflection layer 3 is formed. For example, as the light reflection layer 3, there can be used metallic thin film in which metallic material such as Al, Ag, Au, etc. is formed as a film. This light reflection layer 3 is formed as film so that it has a predetermined thickness by the technique, e.g., sputtering process, etc.

Further, in this optical disc 1, the signal recording layer 4 is formed on the light reflection layer 3. As this signal recording layer 4, there can be used material capable of recording the information signal as magnetization direction, e.g., amorphous alloy thin film, etc. such as Th-Fe-Co, etc. or magnetic material having magneto-optical characteristics such as the Kerr effect or Faraday effect, etc. Further, as the signal recording layer 4, there may be used material capable of recording information signals as the phase state of amorphous state and crystalline state, e.g., chalcogen of simple substance or chalcogen compound. As chalcogen of simple substance or chalcogen compound, there can be exemplified respective simple substances of Te, Se, and chalcogenite system material such as Ge-Sb-Te, Ge-Te, In-Sb-Te, In-Se-Te-Ag, In-Se, In-Se-Te-Co, In- Se-Sb, $Bi_2Te_3$, Bi-Se, $Sb_2Se_3$, Sb2Te3, etc.

Further, in this optical disc 1, light transmission layer 5 is formed so as to cover the signal recording layer 4. Since light used at the time of recording/reproduction is transmitted through this light transmission layer 5, resin material having excellent water transmission characteristics is used as the light transmission layer 5. In addition, this light transmission layer 5 can prevent exterior moisture and/or oxygen component from being admitted into the optical disc 1 to corrode the signal recording layer 4 or the light reflection layer 3.

At the time of manufacturing the optical disc 1 as described above, a stamper having a reversed uneven pattern having a shape such that uneven pattern 10 on the substrate 2 is reversed and having a central hole formed substantially at the central portion is first manufactured. Then, this stamper is used to manufacture substrate 2 having an uneven pattern 10 obtained by transferring the reversed uneven pattern. Then, the substrate 2 thus manufactured is used to prepare the light transmission layer 3, signal recording layer 4 and light transmission layer 5 thus to manufacture the optical disc 1.

Figure 3:
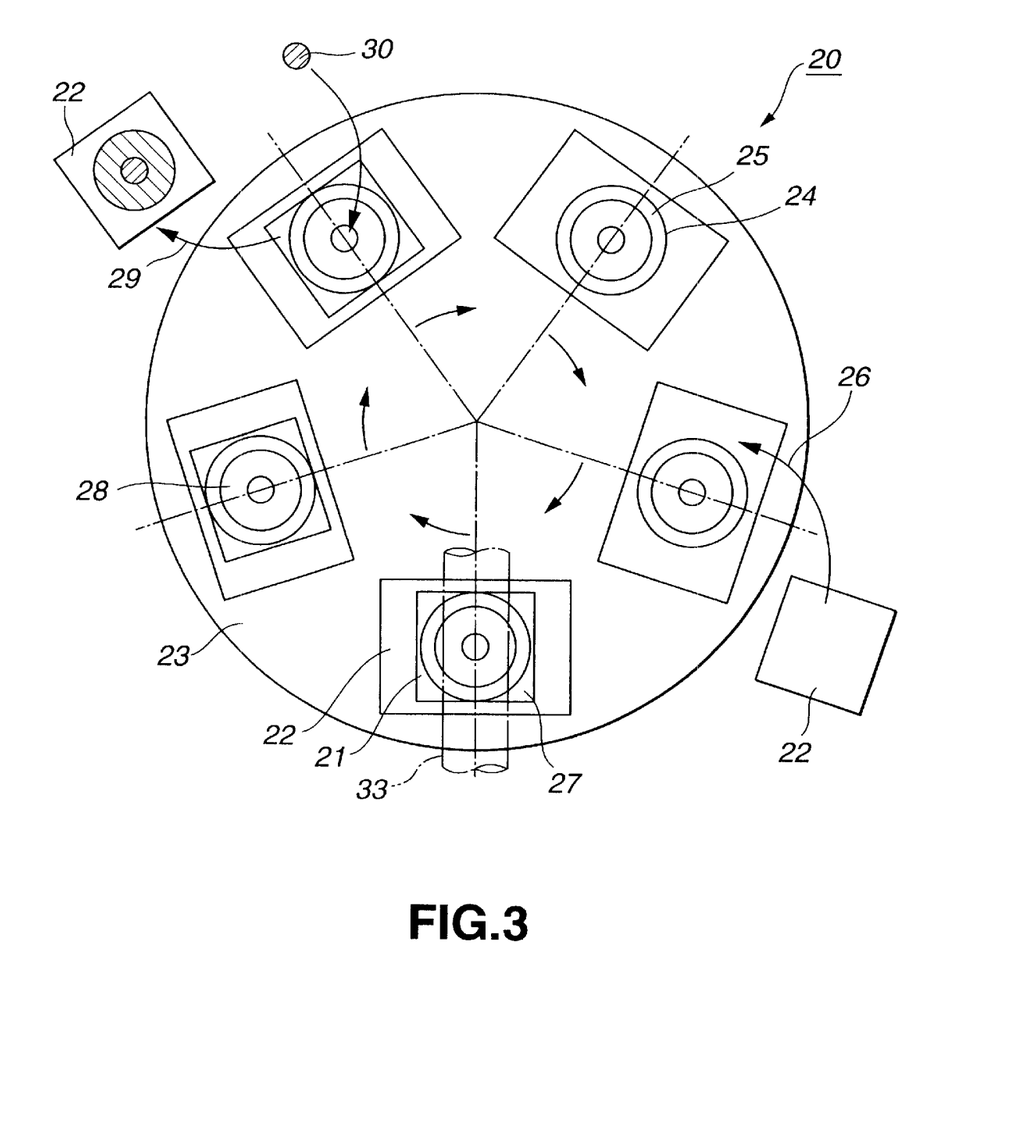
FIG. 3 is a schematic view of a pressure-fitting type molding unit.

The process for manufacturing the substrate 2 will now be described in detail. In the process for manufacturing the substrate 2, pressure-fitting type molding unit 20 schematically shown in FIG. 3 is used. More, particularly, this pressure-fitting type molding unit 20 is used to prepare stacked sheet 22 in which reversed uneven pattern of the stamper 21 is transferred thereafter to cut the stacked sheet 22 so as to take a predetermined shape to thereby manufacture the substrate 2. It is to be noted that the light reflection layer 3, etc. may be formed on the stacked sheet 22 in which the reversed uneven pattern of the stamper 21 is transferred thereafter to cut such stacked sheet so as to take a predetermined shape to manufacture the optical disc 1.

This pressure-fitting type molding unit 20 includes plural metal molds 24 substantially equidistantly disposed in the circumferential direction of a turn table 23, and stampers 21 respectively disposed within these metal molds 24. In a more practical sense, in the pressure-fitting type molding unit 20 shown in FIG. 3, five metal molds 24 respectively having stampers 21 therewithin are disposed on the turn table 23.

Further, in the pressure-fitting qtype molding unit 20, a stamper heating portion 25, a sheet throwing (placing) portion 26, a pressure-fitting portion 27, a cooling portion 28 and a sheet taking out portion 29 are provided in order in the circumferential direction at positions corresponding to the respective metal molds 24 in the state where the turn table 23, is fixed. Further, at the pressure-fitting type molding unit 20, there is provided a rotation control means for rotating stepwise by about 72 degrees the turn table 23 although not shown. Accordingly, in the pressure-fitting type molding unit 20, when the turn table 23 is rotated by about 72 degrees stepwise by the rotation control means, five metal molds 24 are moved in order to the stamper heating portion 25, the sheet throwing (placing) portion 26, the pressure-fitting portion 27, the cooling portion 28 and the sheet taking-out portion 29.

Substantially at the central portion of the metal mold 24, there is formed an attachment portion for disposing a clamping member 30 attached at the center of the substrate 2 and positioning is made such that the central hole of the stamper 21 is caused to be in correspondence with the outer circumference of the clamping member 30.

Figure 4:
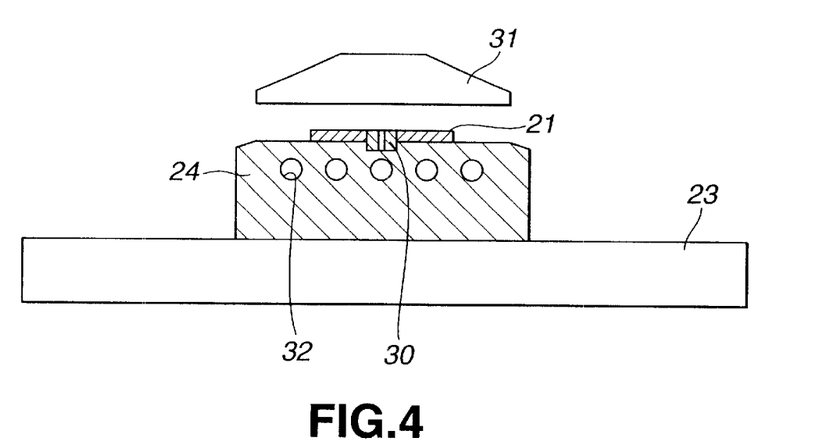
FIG. 4 is an essential part cross sectional view of a stamper heating portion.

The stamper heating portion 25 includes, as shown in FIG. 4, a heater 31 disposed in a manner opposite to the stamper 21 disposed within the metal mold 24. Further, plural metal mold temperature adjusting circuits 32 are formed within the metal mold 24, thus making it possible to adjust the metal mold 24 so that it has a predetermined temperature. The metal mold temperature adjusting circuits 32 are supplied with hot water from, e.g., hot water supply means (not shown), thereby making it possible to heat the entirety of the metal mold 24 so that it has a predetermined temperature. In addition, the heater 31 includes, e.g., far-infrared ray irradiating means or near-infrared ray irradiating means to irradiate far-infrared rays or near-infrared rays, thereby making it possible to heat the stamper 21 attached at the metal mold 24 so that it has a predetermined temperature.

The sheet throwing (placing) portion 26 includes a carrying means for carrying a stacked sheet 22 in which the intermediate layer 8 and the surface layers 9 are stacked onto the metal mold 24, thus making it possible to throw (place) the stacked sheet 22 onto the metal mold 24. This stacked sheet 22 is obtained by adhering, by, e.g., adhering agent (bond), the above-described intermediate layer 8 composed of fiber layer 6 and core layers 7 and the surface layers 9 so that they are integrated, and has a size sufficient to cover the entire surface of the stamper 21. In addition, it is preferable that the fitting hole adapted so that the clamping member 30 is fitted is formed substantially at the central portion of the stacked sheet 22. It is to be noted that the stacked sheet 22 may be obtained by stacking the intermediate layer 8 of simple substance and the surface layer 9 of simple substance without using adhering agent. At the sheet throwing (placing) portion 26, the stacked sheet 22 is thrown (placed) in a manner such that the surface layer 9 is opposite to the stamper 21.

Figure 5:
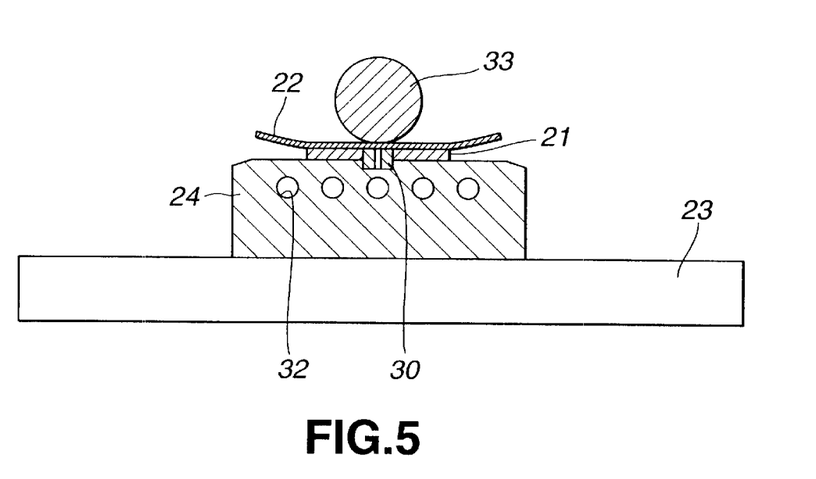
FIG. 5 is an essential part cross sectional view of a pressure-fitting portion.

The pressure fitting portion 27 includes, as shown in FIG. 5, a roll 33 disposed with a predetermined spacing with respect to the metal mold 24 and moving means for moving this roll 33 in the circumferential direction of the turn table 23 while rotating it in the circumferential direction. The roll 33 has a length dimension slightly greater than the diameter of the stamper 21, and moves in the circumferential direction of the turn table 23, thereby making it possible to press the stacked sheet 22 onto the entire surface of the stamper 21. Further, it is preferable that the surface of the roll 33 is controlled so that its temperature is smaller than the temperature of metal mold 24 or stamper 21 for the purpose of preventing fusing with respect to the stacked sheet 22. Namely, it is preferable that the temperature control means is disposed at the roll 33.

A distance (clearance) between the roll 33 and the metal mold 24 is caused to be to such an extent that the stacked sheet 22 can be pressed onto the stamper 21 in the state where the stacked sheet 22 is thrown or placed onto the stamper 21. It is to be noted that it is sufficient at this pressure-fitting portion 27 that the roll 33 can relatively move with respect to the metal mold 24, and it is not necessarily required to move the roll 33 in the circumferential direction of the turn table 23. Namely, it is sufficient that the turn table 23 itself is rotated by the above-described rotation control means so that the roll 33 presses the stacked sheet 22 with respect to the entire surface of the stamper 21.

The cooling portion 28 delivers coolant, e.g., from the coolant supply unit to the metal mold temperature adjusting circuits 32, thereby making it possible to cool the metal mold 24 and to cool the stacked sheet 22 pressed onto the stamper 21. In addition, the cooling portion 28 may be caused to be of such a configuration to spray cooling gas, etc. for the purpose of efficiently cooling the stacked sheet 22. Namely, it is preferable that the cooling portion 28 has a nozzle for ejecting cooling gas.

The sheet taking out portion 29 includes, although not shown, an eject unit for mechanically thrusting out the clamping member 30 periphery, an air blow unit for thrusting out the outer circumferential portion of the stacked sheet 22 by air pressure, and a taking out means for taking out the stacked sheet 22 separated or peeled off from the metal mold 24. It is to be noted that, e.g., in the case where the clamping member 30 consists of magnetic metal such as SUS, etc., there may be employed such a mechanism to carry out the taking-out operation by using magnet. In addition, since the stacked sheet 22 is taken out from the metal mold 24 thereafter to prepare new stacked sheet 22 by using this metal mold 24, it is preferable that the sheet taking out portion 29 has clamping member carrying means which disposes (installs) new clamping member 30 substantially at the central portion of the metal mold 24.

In the pressure-fitting type molding unit 20 thus constituted, stampers 21 are respectively first attached to all metal molds 24 and clamping member 30 is attached substantially at the central portion of the metal mold 24 positioned at the sheet taking out portion 29. Then, the turn table 23 is rotated by about 72 degrees clockwise in FIG. 3 so that the metal mold at which the clamping member 30 is attached is positioned at the stamper heating portion 25.

Then, the metal mold 24 positioned at the stamper heating portion 25 is heated so that it has a predetermined temperature by delivering hot water to the metal mold temperature adjusting circuits 32, and the stamper 21 attached at the above-mentioned metal mold 24 is heated by the heater 31 so that it has a predetermined temperature. At this time, the stamper 21 surface is heated so that its temperature is above the glass transition point of resin constituting the surface layer 9. In this example, the temperature of the metal mold 24 is adjusted at all times so that stamper 21 surface temperature is not suddenly lowered and it has a temperature less than the thermal deformation temperature such that the stacked sheet 22 after undergone transfer is not deformed. It is to be noted that, at the stamper heating portion 25, metal mold 24 may be heated by heating means such as a heater, etc. separately disposed. Then, the turn table 23 is rotated for a second time by about 72 degrees clockwise in FIG. 3 to position the metal mold 24 which has been heated at the sheet throwing (placing) portion 26. At this sheet throwing (placing) portion 26, the stacked sheet 22 is thrown or placed onto the stamper 21 so that the stamper 21 which has been heated and the surface layer 9 are opposite to each other. At this time, it is preferable to heat in advance the surface layer 9 at the stacked sheet 22, before the stacked sheet 22 is thrown or placed by the heating means disposed at the outside of the pressure-fitting type molding unit 20. Thus, it is possible to transfer, in a short time, the reversed uneven pattern formed at the stamper 21.

Then, the turn table 23 is rotated by about 72 degrees clockwise in FIG. 3 for a second time to position the metal mold 24 in which the stacked sheet 22 has been thrown or placed at the pressure-fitting portion 27. At the pressure fitting portion 27, the roll 33 is moved in the circumferential direction of the turn table 23 by the moving means while rotating it in the circumferential direction. Thus, in the metal mold 24 positioned at the pressure-fitting portion 27, the stacked sheet 22 is pressure-fitted at a predetermined pressure with respect to the stamper 21 which has been heated. At this time, since surface temperature of the stamper 21 is heated so that it is the above glass transition point of resin constituting the surface layer 9, resin constituting the surface layer 9 is fused, thus making it possible to transfer the reversed uneven pattern of the stamper 21 surface onto the surface layer 9, and to integrate the clamping member 30 with the stacked sheet 22.

At this time, by controlling the roll 33 surface so that it has a predetermined temperature, in a more practical sense, a temperature smaller than the surface temperature of the stamper 21, it is possible to prevent fusing between the roll 33 surface and the stacked sheet 22. Thus, in the stacked sheet 22, the reversed uneven pattern of the stamper 21 is securely transferred without producing positional shift.

It is to be noted that in the case where the roll 33 can be rotated in the circumferential direction without being moved with respect to the turn table 23, the turn table 23 is rotated by about 72 degrees clockwise in FIG. 3 so that the stacked sheet 22 can be pressed onto the stamper 21. Namely, in this case, when the turn table 23 is rotated by about 72 degrees clockwise in FIG. 3, the stacked sheet 22 is gradually pressure-fitted with respect to the stamper 21 by the roll 33 from the front end portion of the rotational direction of the turn table 23 toward the rear end portion thereof.

Figure 6:
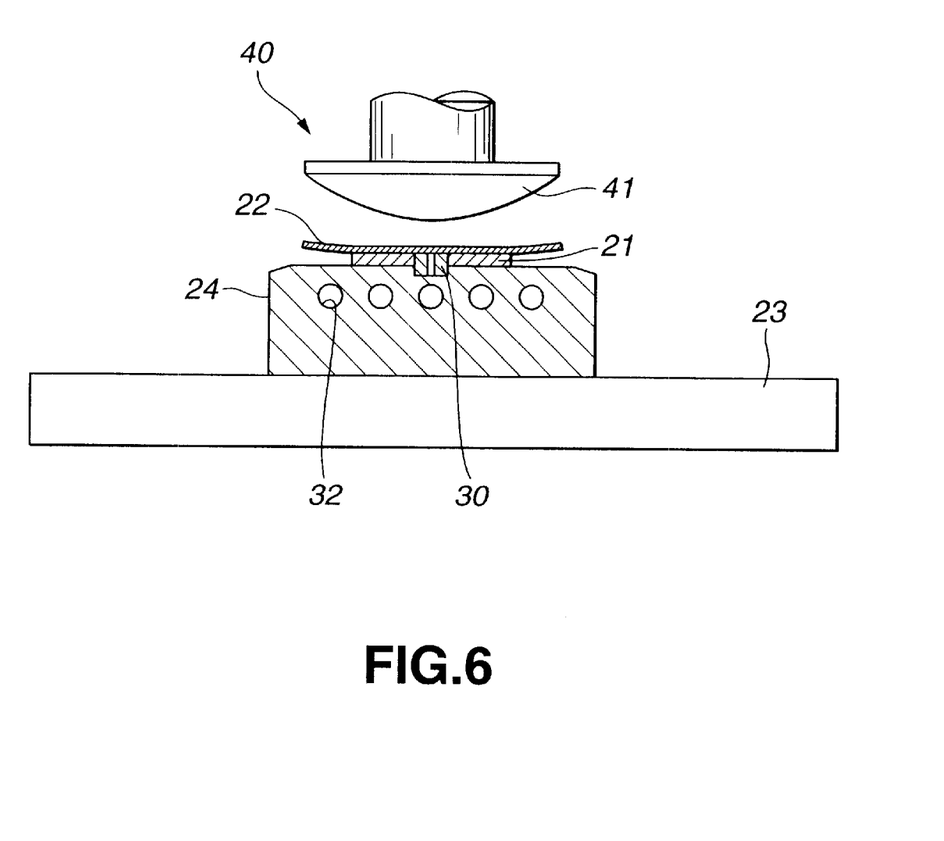
FIG. 6 is an essential part cross sectional view of a stamper heating portion shown as another example.

Further, the pressure-fitting portion 27 may employ a configuration having a pressure-fitting pad 40 as shown in FIG. 6 in place of the configuration having roll 33 as described above. This pressure-fitting pad 40 has elasticity and has a pad portion 41 formed spherical with the portion opposite to the clamping member 30 being a convex portion. The pressure-fitting pad 40 can be driven in directions to allow the pad portion 41 to be close to the stacked sheet 22 and to be away therefrom. In this case, the pressure fitting pad 40 is caused to be in contact with the stacked sheet 22 at a predetermined pressure, thereby making it possible to press the pad portion 41 onto the stacked sheet 22. At this time, since the pad portion 41 has elasticity, it is possible to gradually pressure-fit the stacked sheet 22 with respect to the stamper 21 from the clamping member 30 toward the outer circumference of the stamper 21.

Then, the turn table 23 is rotated by about 72 degrees clockwise in FIG. 3 for a second time to position the metal mold 24 at which the stacked sheet 22 is pressure-fitted at the cooling portion 28. At this cooling portion 28, by delivering coolant to the metal mold temperature adjusting circuits 32, the metal mold 24 is cooled, and the stamper 21 and the stacked sheet 22 are cooled. Thus, the temperature of the surface layer 9 which is pressure-fitted to the stamper 21 reaches a temperature less than the glass transition temperature so that the surface layer 9 is hardened. At this time, at the cooling portion 28, by spraying cooling gas from nozzle toward the stacked sheet 22, it is possible to efficiently cool the stacked sheet 22. Accordingly, the cooling time can be reduced substantially.

Then, the turn table 23 is rotated by about 72 degrees clockwise in FIG. 3 for a second time to position the metal mold 24 having cooled stacked sheet 22 at the sheet taking out portion 29. At the sheet taking out portion 29, first the clamping member 30 periphery is pushed or forced out by the eject unit and the outer circumferential portion of the stacked sheet 22 is pushed or forced out by the air blow unit. Subsequently, at the sheet taking out portion 29, the stacked sheet 22 is taken out from the pressure-fitting type molding unit 20 by taking-out means.

As stated above, by rotating the turn table 23 by about 72 degrees clockwise in FIG. 3, the metal mold 24 is positioned in order at the stamper heating portion 25, the sheet throwing (placing) portion 26, the pressure-fitting portion 27, the cooling portion 28 and the sheet taking-out portion 29, thus making it possible to transfer the reversed uneven pattern of the stamper 21 onto the surface layer 9 of the stacked sheet 22. Further, in this pressure-fitting type molding unit 20, five metal molds 24 are used to successively carry out the above-described process steps to thereby drive, at the same time, the stamper heating portion 25, the sheet throwing (placing) portion 26, the pressure fitting portion 27, the cooling portion 28 and the sheet taking out portion 29, thus making it possible to efficiently manufacture stacked sheets 22 in which the reversed uneven pattern of the stamper 21 is transferred.

In the optical disc 1 thus constituted, since there is provided substrate (substrate) 2 in which the intermediate layer 8 composed of a fiber layer 6 and core layers 7 and the surface layers 9 are integrated, bending strength and tensile strength are excellent, and high rigidity can be exhibited. Moreover, in this optical disc 1, since manufacturing of the substrate 2 is carried out by pressure fitting with respect to the stamper 21 and cutting without depending upon injection molding, residual stress within the substrate 2 can be reduced substantially. Thus, in this substrate 2, excellent mechanical characteristics can be exhibited and deformation such as curvature, etc. is prevented. Accordingly, this optical disc 1 can prevent tracking error, etc. Thus, excellent recording/reproduction characteristic can be exhibited.

Further, in this substrate 2, since the surface layer 9 consists of resin material excellent in the transfer characteristic, it is possible to securely transfer the reversed uneven pattern of the stamper 21. In other words, the fine uneven pattern 10 is securely formed on the substrate 2 in correspondence with high density recording. Accordingly, this substrate 2 can cope with high density recording having excellent transfer characteristics and can exhibit excellent mechanical characteristics, which could not be realized in the prior art.

Figure 7:
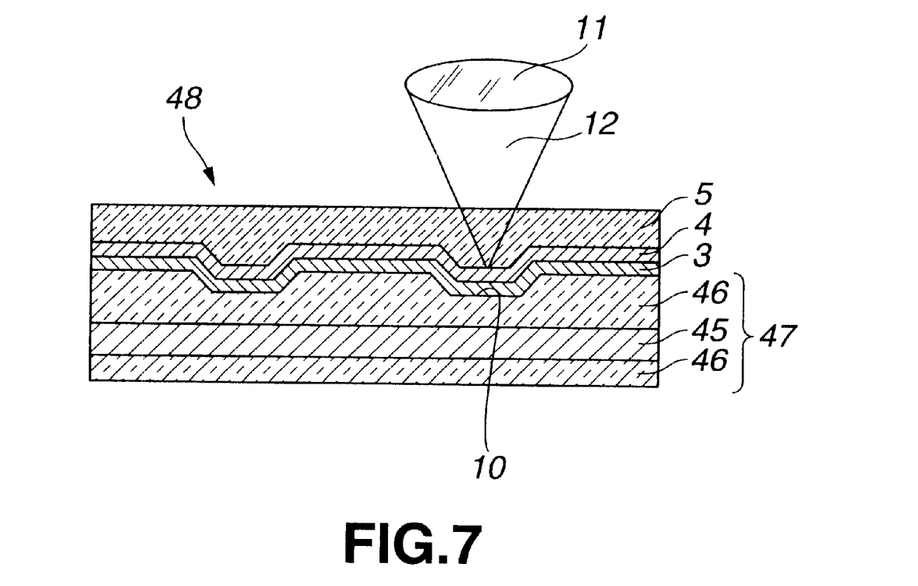
FIG. 7 is an essential part cross sectional view of an optical disc shown as another example of the optical recording medium according to this invention.

Further, while, in the optical disc 1, the substrate 2 has a configuration composed of intermediate layer 8 consisting of fiber layer 6 and core layers 7 and surface layers 9, this invention is not limited to an optical disc having substrate 2 of such configuration. As an optical disc to which this invention is applied, e.g., as shown in FIG. 7, there may be employed an optical disc 48 including a substrate 47 composed of a single intermediate layer 45 and surface layers 46 formed on both principal surfaces of this intermediate layer 45. Also in this optical disc 48, similarly to the above-described optical disc 1, there are provided light reflection layer 3, signal recording layer 4 and light transmission layer 5.

In this optical disc 48, as the intermediate layer 45, there may be used a layer in a sheet form obtained by impregnating resin into fiber material such as carbon fiber or unwoven cloth, etc., a layer in a sheet form consisting of resin having excellent rigidity and a layer in a sheet form consisting of resin in which granulated filling material such as graphite, etc. is added. Alternatively, there may be employed layer material obtained by allowing resin in which plate-shaped filling material such as mica or glass, etc. is added to be in a sheet form. Since this intermediate layer 45 is not obtained by transferring the reversed uneven pattern formed on the stamper 21, it is sufficient to select this intermediate layer only in consideration of mechanical characteristics such as rigidity, etc. or resonance characteristics without taking transfer characteristics into consideration.

Further, since the surface layer 46 is a layer obtained by transferring the reversed uneven pattern formed on the stamper 21 similarly to the above-described optical disc 1 there may be a used layer obtained by allowing a resin having excellent transfer characteristics to be in a sheet form. While mechanical characteristics such as rigidity, etc. and/or resonance characteristics are improved by the above-described intermediate layer 45 in the case of this substrate 47, materials excellent in mechanical characteristics or resonance characteristic may be used also as resin used for the surface layer 46.

Further, the substrate 47 is manufactured by sticking the above-described intermediate layer 45 and the surface layers 46 by fusing or adhesive agent, etc. within the same metal mold to transfer the reversed uneven pattern formed on the stamper 21 onto the surface layer 46 similarly to the above-described substrate 2. Since the intermediate layer 45 is caused to be single layer, the substrate 47 is permitted to be of thinner thickness structure as compared to the above-described substrate 2. Accordingly, when this substrate 47 is used, there is provided an optical disc 47 more suitable for optical system using light of short wavelength and object lens of high N.A.

Figure 8:
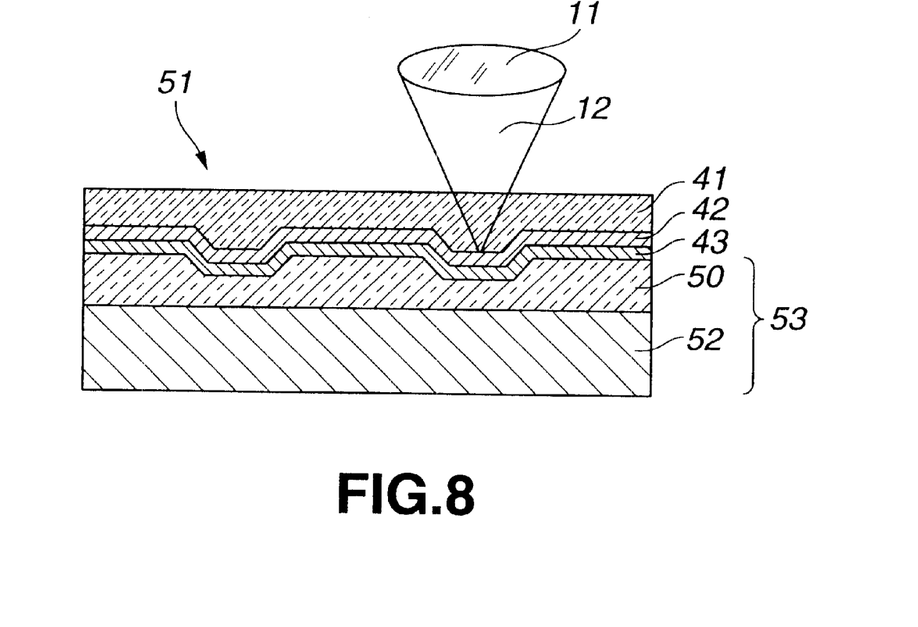
FIG. 8 is an essential part cross sectional view of an optical disc shown as a further example of the optical recording medium according to this invention.

It is to be noted that, as the optical disc to which this invention is applied, as shown in FIG. 8, there may be employed an optical disc 51 provided with such a substrate 53 that a surface layer 50 is provided only on the surface where the un even pattern 10 is formed. Namely, in this case, in the optical disc 51, the surface layer 50 is formed on only one principal surface of an intermediate layer 52, and the uneven pattern 10 is transferred onto this surface layer 50. Also in this case, resonance characteristics and mechanical characteristics such as rigidity, etc. are improved by the intermediate layer 52. Thus, the fine uneven pattern 10 is formed on the surface layer 50 having excellent transfer characteristics. Additionally, reference numerals 41, 42, 43 denote the light transmission layer, signal recording layer and light reflection layer, respectively.

On the other hand, the optical disc according to this invention is not limited to the configuration including the light transmission layer 5 and adapted so that laser beams 12 are irradiated through the object lens 11 from this light transmission layer 5 side, but there may be employed a configuration such that laser beams 12 are irradiated through the object lens 11 from the substrate 2 side. In this case, the substrate 2 is composed of an optically transparent intermediate layer 8 which does not include fiber material or filling agent, etc. and surface layers 9 where the uneven pattern 10 is formed. Since laser beams 12 are required to be transmitted through the intermediate layer 8 and the surface layer 9 in this substrate 2, it is sufficient that the refraction factor falls within the range of 1.55±0.1 and those layers are optically transparent.

EMBODIMENTS

Explanation will be given on the basis of experimental results in connection with more practical embodiments of this invention. In the following description, in order to examine mechanical characteristics and resonance characteristics, etc. of the optical disc to which this invention is applied, substrates as described below were made (manufactured) to carry out evaluation.

First Embodiment

An optical disc as shown in FIG. 1 was manufactured. The surface layer, and the intermediate layer consisting of a core layer and fiber layer were prepared by using materials as described below.

<Resin material for surface layer>

Resin material: ZEONEX E-490(by Nihon Zeon Kabushiki Kaisha)

Glass transition temperature: 136° C (Measurement method DSC)

Bending elastic modulus: 23,000 kgf/cm$^2$(ASTM D790)

Thermal deformation temperature: 122° C (ASTM D648)

Percentage of water absorption: 0.01% or less (ASTM D570)

Refraction factor: 1.53 nd 25 (ASTM D542)

Specific gravity: 1.01 (ASTM D792)

Photoelasticity constant: 2 ×10$^{-13}$ cm$^2$/dyne

The surface layer was prepared by allowing ZEONEX E-490 to be in a form of thin plate a having thickness of 0.2 mm.

<Resin material for core layer>

Resin material: ZEONR 1420 (by Nihon Zeon Kabushiki Kaisha)

Glass transition temperature: 136° C

Bending elastic modulus: 22,000 kgf/cm$^2$

Thermal deformation temperature: 136° C

Percentage of water absorption: 0.01% or less

Refraction factor: 1.53 nd 25

Specific gravity: 1.03

Photoelasticity constant: 6.5×10$^{-13}$cm$^2$/dyne

<Fiber material for fiber layer>

Fiber material: Torekamat BO 050 (by Toray Kabushiki Kaisha)

Fiber length: 24 mm

Thickness: 0.79 mm

Weight: 30 g/m$^2$

Resin material ZEONEX 490 (by Nihon Zeon Kabushiki Kaisha)

First, Torekamat BO 050 was immersed into solution in which ZEONEX 490 is dissolved into toluene at a concentration of 30% by weight thereafter to remove toluene to thereby prepare the resin impregnated fiber layer. Then, ZEONEX 1600 R was caused to be in a form of thin plate having a thickness of 0.2 mm to prepare the core layer. Then, an article in which the fiber layer is put between a pair of core layers was pressed under the condition where the temperature is 150° C and the pressure is 30 kg/cm$^2$ or more thereafter to cool the article thus pressed to thereby prepare the intermediate layer having a thickness of 0.4 mm.

Then, the intermediate layer was caused to be put between a pair of surface layers to fuse and join (connect) the pair of surface layers and the intermediate layer by the pressure-fitting type molding unit shown in FIG. 3 and to transfer an uneven pattern onto the surface layers. The condition at this time is as follows.

Stamper surface temperature: 170° C

Roll surface temperature: 130° C

Roll pressure application force: 100 kgf

Temperature at the time of cooling: 100° C

At this time, the uneven pattern having a shape as described below was formed.

Signal depth: 100 nm

Track pitch: 0.7 μm (DC groove)

Thereafter, punching processing was implemented so that the diameter was equal to 12 mm to successively form the light reflection film, signal recording film and light transmission film to thereby manufacture the optical disc of the first embodiment. The result of comparison between the optical disc of this first embodiment and the optical disc consisting of simple substance of resin (comparative example 1) is shown in Table 1. In the Table 1, the first embodiment is referred to as "five layer structure disc" and the comparative example 1 is referred to as "conventional disc".

TABLE 1

|  | Five-Layer Structure Disc | Conventional Disc |  |
|---|---|---|---|
| Bending Elastic Modulus | 48,000 kgf/cm$^2$ | 23,000 kgf/cm$^2$ | ASTM D790 |
| Specific Gravity | 1.03 | 1.01 |  |
| Thermal Deformation Temperature | 142° C. | 122° C. | ASTM D648 |
| Percentage of Water Absorption | <0.01% | <0.01% | ASTM D570 |

As apparent from Table 1, in the optical disc of the first embodiment, as compared to the optical disc of the comparative example 1, the bending elastic modulus is improved substantially, and the thermal deformation temperature is also improved. From these facts, it is understood that the optical disc of the first embodiment has excellent rigidity and has excellent rotation characteristics.

Second Embodiment

In the second embodiment, an optical disc as shown in FIG. 7 was manufactured. The surface layer and the intermediate layer were prepared by using materials as described below.

<Resin material for surface layer>

Resin material: polycarbonate ST-3000 (by Teijin Kasei Kabushiki Kaisha)

Glass transition temperature: 145° C

Bending elastic modulus: 28,700 kgf/cm$^2$

Thermal deformation temperature: 133° C

Percentage of water absorption: 0.15% or less

Refraction factor: 1.585 nd 25

Specific gravity: 1.13

Photoelasticity constant: 45×10$^{-13}$ cm$^2$/dyne

Polycarbonate ST-3000 was forced out so that its thickness was equal to 0.2 mm to allow the article to be in a sheet form to thereby prepare the surface layer.

<Material for intermediate layers>

Fiber material: Toreka texitile fabrics prepreg 2500 (By Toray kabushiki kaisha) (Material in which epoxy resin is impregnated into carbon fiber fabrics)

Warp/Weft: Flat fabrics of respective T300-3000 filaments

Resin percentage content: 40%

Thickness: 0.25 mm

The intermediate layer was put between a pair of surface layers to fuse and join (connect) the pair of surface layers and the intermediate layer by the pressure fit type molding unit shown in FIG. 3 and to transfer the uneven pattern onto the surface layer.

The condition at that time was as follows.

Stamper surface temperature: 180° C

Roll surface temperature: 140° C

Roll pressure application force: 100 kgf

Temperature at time of cooling: 100° C

At that time, the uneven pattern having shape as described below was formed.

Signal depth: 100 nm

Track pitch: 0.7 μm (DC groove)

After the stacked sheet was taken out from the pressure-fitting type molding unit, it was left for 15 minutes within heating furnace of 110 C to carry out hardening of the epoxy resin. Thereafter, punching processing was implemented so that the diameter was equal to 12 mm to successively form the light reflection film, signal recording film and light transmission layer to thereby manufacture the optical disc of the second embodiment. The result of comparison between the optical disc of this second embodiment and the optical disc consisting of simple substance of resin (comparative example 2) is shown in Table 2. In the Table 2, the second embodiment is referred to as "three-layer structure 0.6 t disc" and the comparative example 2 is referred to as "conventional 0.6 t disc".

TABLE 2

|  | Three-Layer Structure 0.6t Disc | Conventional 0.6t Disc |  |
| --- | --- | --- | --- |
| Bending Elastic Modulus | 62,000 kgf/cm² | 23,000 kgf/cm² | ASTM D790 |
| Specific Gravity | 1.21 | 1.2 |  |
| Thermal Deformation Temperature | 142° C. | 122° C. | ASTM D648 |
| Percentage of Water Absorption | <0.15% | <0.3% | ASTM D570 |

As apparent from this Table 2, in the optical disc of the second embodiment, as compared to the optical disc of the comparative example 2, bending elastic modulus is improved substantially, and thermal deformation temperature is also improved. From these facts, it is understood that the optical disc of the second embodiment has excellent rigidity and has excellent rotation characteristics.

Figure 9:
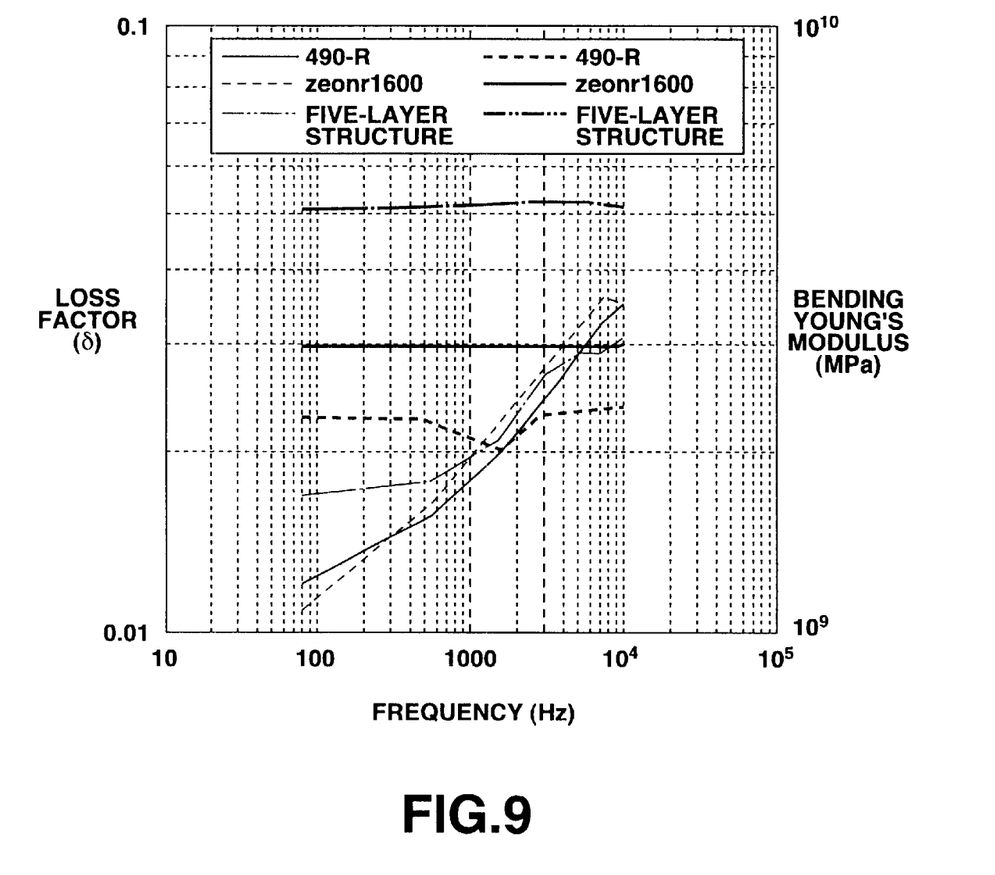
FIG. 9 is a characteristic diagram showing resonance characteristic in an optical disc manufactured as a second embodiment.

Further, the result of comparison between resonance characteristics of the optical disc of the second embodiment and that of the optical disc including the substrate comprised of simple substance of resin is shown in FIG. 9. At this time, for the substrate comprised of simple substance of resin, 490-R and Zeonr 1600 were used. As understood from this figure, in the optical disc of the second embodiment, both loss factor and bending Young's modulus are excellent, and excellent resonance characteristics are provided when compared to the optical disc including the substrate consisting of simple substance of resin.

Third Embodiment

In the third embodiment, an optical disc as shown in FIG. 7 was manufactured. The surface layer and the intermediate layer were prepared by using materials as described below.

<Resin material for surface layer>

Resin material: ZEONEX E-490 (by Nihon ZEON Kabushiki kaisha)

Glass transition temperature: 136° C (Measurement Method DSC)

Bending elastic modulus: 23,000 kgf/cm² (ASTM D790)

Thermal deformation temperature: 122° C (ASTM D648)

Percentage of water absorption: 0.01% or less (ASTM D570)

Refraction factor: 1.53 nd 25 (ASTM D542)

Specific gravity: 1.01 (ASTM D792)

Photoelasticity constant: $2 \times 10^{-13}$ cm²/dyne

ZEONEX E-490 was forced out so that the thickness was equal to 0.2 mm to allow it to be in a sheet form to prepare surface layer.

<Material for intermediate layers>

Resin material: ZEONR 1600 (by Nihon Zeon Kabushiki Kaisha)

Glass transition temperature: 163° C

Bending elastic modulus: 28,000 kgf/cm²

Thermal deformation temperature: 141° C

Percentage of water absorption: 0.01% or less

Refraction factor: 1.53 nd 25

Specific gravity: 1.03

Photoelasticity constant: $6.5 \times 10^{-13}$ cm²/dyne

Such materials were used to manufacture the optical disc of the third embodiment in a manner similar to the first embodiment. The result of comparison between the optical disc of this third embodiment and the optical disc consisting of the simple substance of polycarbonate resin is shown in FIG. 10.

Figure 10:
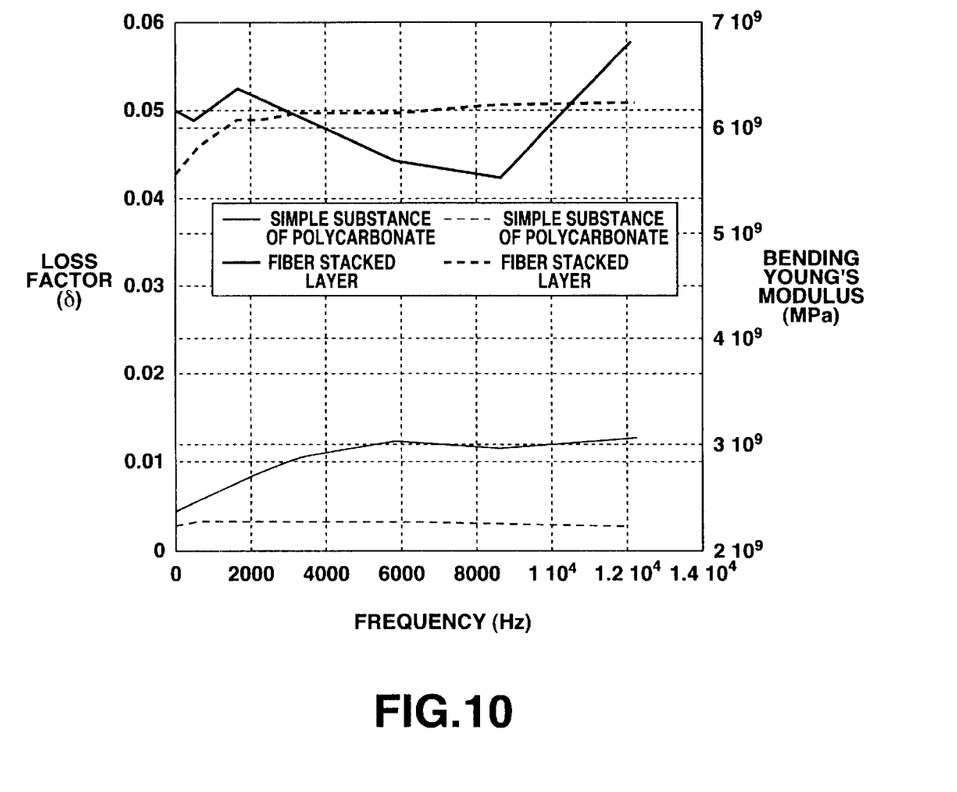
FIG. 10 is a characteristic diagram showing resonance characteristic in an optical disc manufactured as a third embodiment.

As seen from this FIG. 10, in the optical disc of the third embodiment, both loss factor and bending Young's modulus are excellent, and excellent resonance characteristics are provided when compared to the optical disc including the substrate consisting of polycarbonate resin (comparative example 3).

Fourth Embodiment

In the fourth embodiment, an optical disc in which a clamping member is integrated was manufactured. As the clamping member, a magnetic metal material (SUS 403) for magnet was used. The surface layer and the intermediate layer were prepared by using materials as described below.

<Resin material for surface layer>

Resin material: polycarbonate ST-3000 (by Teijin Kasei Kabushiki kaisha)

Glass transition temperature: 143° C

Bending elastic modulus: 28,700 kgf/cm$^2$

Thermal deformation temperature: 133° C

Percentage of water absorption: 0.15% or less

Refraction factor: 1.585 nd25

Specific gravity: 1.13

Photoelasticity constant: 45×10$^{-13}$ cm$^2$/dyne

Polycarbonate ST-3000 was forced out so that the thickness was equal to 0.2 mm to allow it to be in a sheet form to prepare the surface layer.

<Resin material for surface layer>

Resin material Polycarbonate: AD-9000TG (by Teijin Kasei Kabushiki Kaisha)

Glass transition temperature: 143° C

Bending elastic modulus: 28,700 kgf/cm$^2$

Thermal deformation temperature: 133° C

Percentage of water absorption: 0.3%

Refraction factor: 1.585 nd 25

Specific gravity: 1.2

Photoelasticity constant: 80×10$^{-13}$cm$^2$/dyne

Polycarbonate AD-9000 was forced out so that the thickness was equal to 1.2 mm to allow it to be in a sheet form to prepare the intermediate layer.

Such materials were used to manufacture the optical disc of the fourth embodiment having clamping the member similarly to the first embodiment. The result of comparison between the optical disc of the fourth embodiment and the optical disc where a simple substance of ZEONEX is injection-molded (comparative example 4, referred to as "ZEONEX INJ" in FIG. 11) and the optical disc where a simple substance of polycarbonate is injection-molded (comparative example 5, referred to as "PC INJ" in FIG. 11) is shown in FIG. 11.

Figure 11:
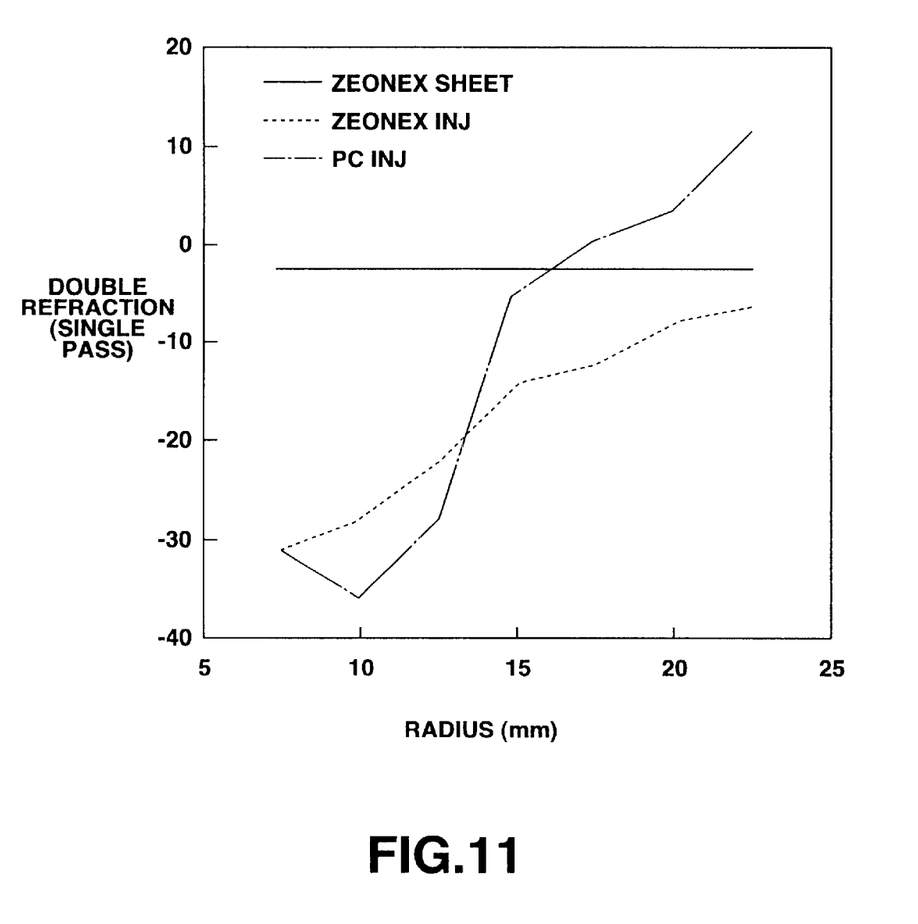
FIG. 11 is a characteristic diagram showing uniformness of double refraction in an optical disc manufactured as a fourth embodiment.

From this FIG. 11, it is seen that the optical disc of the fourth embodiment exhibits uniform double refraction factor in the radial direction when compared to the optical disc of the comparative example. Accordingly, the optical disc of the fourth embodiment can exhibit constant recording/reproduction characteristics in the radial direction.

As described in detail, since the optical recording medium according to this invention comprises the intermediate layer including rigidity rendering material and the surface layer or layers, there is provided a substrate excellent in rigidity and resonance characteristics and excellent in transfer characteristics. Thus, there is provided an optical recording medium which has no deformation such as curvature or concave portion, etc., has sufficient rotational performance, and can sufficiently cope with the realization of high recording density.

In addition, in the method of manufacturing the optical recording medium according to this invention, there is employed such an approach to pressure-fit the stamper, the surface layer and the intermediate layer to thereby integrate the surface layer and the intermediate layer and to transfer the reversed uneven pattern onto the surface layer. For this reason, in accordance with this technique, it is possible to manufacture the optical recording medium which has no deformation such las curvature or concave portion, etc., has sufficient rotational performance and sufficiently copes with realization of high recording density.

I claim:

1. An optical recording medium comprising a substrate and a recording layer where uneven pattern is formed on at least one principal surface, and recording and/or reproduction of recording signals are carried out by the irradiated light, wherein the substrate consists of an intermediate layer and a surface layer stacked on the both principal surface sides of the intermediate layer; and wherein the intermediate layer consists of a fiber layer including fiber material and a pair of resin layers integrally formed through the fiber layer.

2. The optical recording medium as set forth in claim 1, wherein the resin layer consists of the same resin material as that of the surface layer.

3. The optical recording medium as set forth in claim 1, wherein the fiber layer substrate is adapted so that resin material is impregnated into the fiber material.

4. The optical recording medium as set forth in claim 3, wherein the resin material impregnated into the fiber material is the same resin material as that of the surface layer.

5. The optical recording medium as set forth in claim 1, wherein an adhering layer is disposed between the intermediate layer and the surface layer.

6. A method of manufacturing an optical recording medium comprising a substrate and a recording layer where uneven pattern is formed on at least one principal surface, whereby recording and/or reproduction of recording signals are carried out by the irradiated light, the method comprising:

disposing a surface layer so as to oppose one principal surface of a stamper where uneven pattern is formed on the one principal surface, and stacking an intermediate layer including rigidity rendering material onto the surface layer; and heating and pressure-fitting the stamper, the surface layer and the intermediate layer to thereby integrate the surface layer and the intermediate layer and to transfer the uneven pattern onto the surface layer.

7. The method of manufacturing the optical recording medium as set forth in claim 6, wherein the surface layer and the intermediate layer are adhered or connected through adhering agent.

8. The method of manufacturing the optical recording medium as set forth in claim 6, wherein the intermediate layer comprises a fiber layer including fiber material and a pair of resin layers integrally formed through the fiber layer, and wherein, prior to forming the uneven pattern, the fiber layer and the pair of resin layers are caused to undergo prebake treatment to thereby semi-harden the fiber layer and the intermediate layer.

9. The method of manufacturing the optical recording medium as set forth in claim 6, wherein the surface opposite to the surface layer of the stamper is heated.

* * * * *